(12) United States Patent
Musuya Mbombo et al.

(10) Patent No.: US 12,305,678 B2
(45) Date of Patent: May 20, 2025

(54) EXPANDABLE ANCHOR INSTALLATION TOOL AND METHODS OF USE THEREOF

(71) Applicant: Illinois Tool Works Inc., Glenview, IL (US)

(72) Inventors: Paul Musuya Mbombo, Merrillville, IN (US); Yongping Gong, Wilmette, IL (US)

(73) Assignee: Illinois Tool Works Inc., Glenview, IL (US)

(*) Notice: Subject to any disclaimer, the term of this patent is extended or adjusted under 35 U.S.C. 154(b) by 190 days.

(21) Appl. No.: 18/187,530

(22) Filed: Mar. 21, 2023

(65) Prior Publication Data

US 2023/0313824 A1 Oct. 5, 2023

Related U.S. Application Data

(60) Provisional application No. 63/327,619, filed on Apr. 5, 2022.

(51) Int. Cl.
*F16B 13/04* (2006.01)
*F16B 13/06* (2006.01)

(52) U.S. Cl.
CPC .................. *F16B 13/063* (2013.01)

(58) Field of Classification Search
CPC ...................................... F16B 13/063
USPC ........................................... 411/15
See application file for complete search history.

(56) References Cited

U.S. PATENT DOCUMENTS

| | | | |
|---|---|---|---|
| 1,164,322 A | 12/1915 | Yeatman | |
| 2,871,749 A | 2/1959 | Aaron | |
| 3,659,449 A | 5/1972 | Abernathy | |
| 3,789,728 A | 2/1974 | Shackelford | |
| 3,888,156 A | 6/1975 | Fima | |
| 4,026,186 A * | 5/1977 | Williams, Jr. | F16B 13/003 411/29 |
| 4,055,051 A * | 10/1977 | Finney | E21D 20/026 405/259.6 |
| 4,121,444 A | 10/1978 | Duran | |
| 4,254,542 A | 3/1981 | Craig | |
| 4,331,414 A | 5/1982 | Wheatley | |
| 4,388,031 A | 6/1983 | Rodgers | |
| 4,560,312 A | 12/1985 | Grady | |
| 4,617,692 A | 10/1986 | Bond et al. | |
| 4,657,456 A | 4/1987 | Anquetin | |
| 4,789,282 A | 12/1988 | Abraham | |
| 4,789,283 A | 12/1988 | Crawford | |
| 4,836,062 A | 6/1989 | Latorre | |
| 4,875,815 A | 10/1989 | Phillips | |

(Continued)

FOREIGN PATENT DOCUMENTS

| | | |
|---|---|---|
| EP | 1072802 A1 | 1/2001 |
| EP | 1350965 A2 | 10/2003 |
| WO | 2008041836 A1 | 4/2008 |

OTHER PUBLICATIONS

Sammys® 2018-2019 Product Catalog (15 pages).
Extended European Search Report from European Application No. 23166266.9, dated Nov. 20, 2023 (7 pages).

*Primary Examiner* — Gary W Estremsky

(74) *Attorney, Agent, or Firm* — Neal, Gerber & Eisenberg LLP

(57) ABSTRACT

An expandable anchor installation tool operable to install different types of expandable anchors including self-drilling expandable anchors and non-self-drilling expandable anchors.

15 Claims, 14 Drawing Sheets

(56) References Cited

U.S. PATENT DOCUMENTS

| | | | |
|---|---|---|---|
| 4,984,938 A | 1/1991 | Scott et al. | |
| 4,986,710 A | 1/1991 | Kovarik | |
| 4,990,042 A | 2/1991 | Szayer et al. | |
| 5,147,166 A | 9/1992 | Harker | |
| 5,168,781 A | 12/1992 | Tenuta | |
| 5,207,750 A | 5/1993 | Rapata | |
| 5,286,151 A | 2/1994 | Eshraghi | |
| 5,299,441 A | 4/1994 | Shinjo | |
| 5,313,680 A | 5/1994 | Ringler | |
| 5,419,664 A | 5/1995 | Hengesbach et al. | |
| 5,647,710 A | 7/1997 | Cushman | |
| 6,223,375 B1 * | 5/2001 | Vaughan, Jr. | B25B 21/007 7/138 |
| 6,273,655 B1 | 8/2001 | Mcalpine et al. | |
| 6,443,680 B1 | 9/2002 | Bodin | |
| 6,524,046 B2 | 2/2003 | Hsu | |
| 6,551,040 B1 | 4/2003 | Terry et al. | |
| 6,648,557 B1 | 11/2003 | Morrow et al. | |
| 6,935,821 B2 | 8/2005 | Bodin et al. | |
| 7,296,499 B2 | 11/2007 | Bodin et al. | |
| 7,494,310 B1 | 2/2009 | Bodin et al. | |
| 7,896,580 B2 * | 3/2011 | Weaver | E21D 21/0066 405/259.4 |
| 8,286,736 B2 | 10/2012 | Weaver et al. | |
| 8,662,806 B2 * | 3/2014 | Gillis | F16B 13/002 411/57.1 |
| 8,671,805 B2 | 3/2014 | Henderson et al. | |
| 8,920,091 B2 | 12/2014 | Heinrich et al. | |
| 9,541,116 B2 | 1/2017 | Cabaj et al. | |
| 9,989,080 B1 | 6/2018 | Kunken et al. | |
| 11,692,578 B2 * | 7/2023 | Dill | F16B 25/103 411/387.1 |
| 11,759,921 B2 | 9/2023 | Kao et al. | |
| 2003/0190211 A1 * | 10/2003 | Bodin | B25B 31/00 411/29 |
| 2004/0067121 A1 | 4/2004 | Huang et al. | |
| 2004/0163229 A1 * | 8/2004 | Janusz | B25B 31/00 29/523 |
| 2004/0222115 A1 * | 11/2004 | Openiano | B25H 3/003 206/372 |
| 2005/0058521 A1 | 3/2005 | Stevenson et al. | |
| 2005/0163585 A1 | 7/2005 | Bodin et al. | |
| 2006/0048611 A1 * | 3/2006 | Berdin | F16B 43/001 411/29 |
| 2006/0104742 A1 | 5/2006 | Fleming | |
| 2006/0145431 A1 | 7/2006 | Chang | |
| 2006/0260446 A1 | 11/2006 | Chang | |
| 2007/0292234 A1 | 12/2007 | Panasik et al. | |
| 2008/0008553 A1 | 1/2008 | Gillis et al. | |
| 2008/0008554 A1 | 1/2008 | Lu | |
| 2008/0292422 A1 | 11/2008 | Lin | |
| 2009/0092458 A1 | 4/2009 | Moroney et al. | |
| 2010/0212249 A1 | 8/2010 | Pettingale | |
| 2010/0316465 A1 | 12/2010 | Gillis et al. | |
| 2011/0314768 A1 | 12/2011 | Johnson | |
| 2014/0026716 A1 | 1/2014 | Kasonde et al. | |
| 2014/0079496 A1 | 3/2014 | Cousineau | |
| 2014/0165794 A1 | 6/2014 | Chiang | |
| 2016/0160906 A1 | 6/2016 | Blaess et al. | |
| 2017/0203193 A1 | 7/2017 | Powell et al. | |
| 2018/0141190 A1 | 5/2018 | Prunean | |
| 2018/0180080 A1 * | 6/2018 | Grice | F16B 37/067 |
| 2018/0229350 A1 * | 8/2018 | Naoi | B25B 21/002 |
| 2018/0283434 A1 * | 10/2018 | Kunken | F16B 13/0808 |
| 2021/0372449 A1 | 12/2021 | Kao | |

* cited by examiner

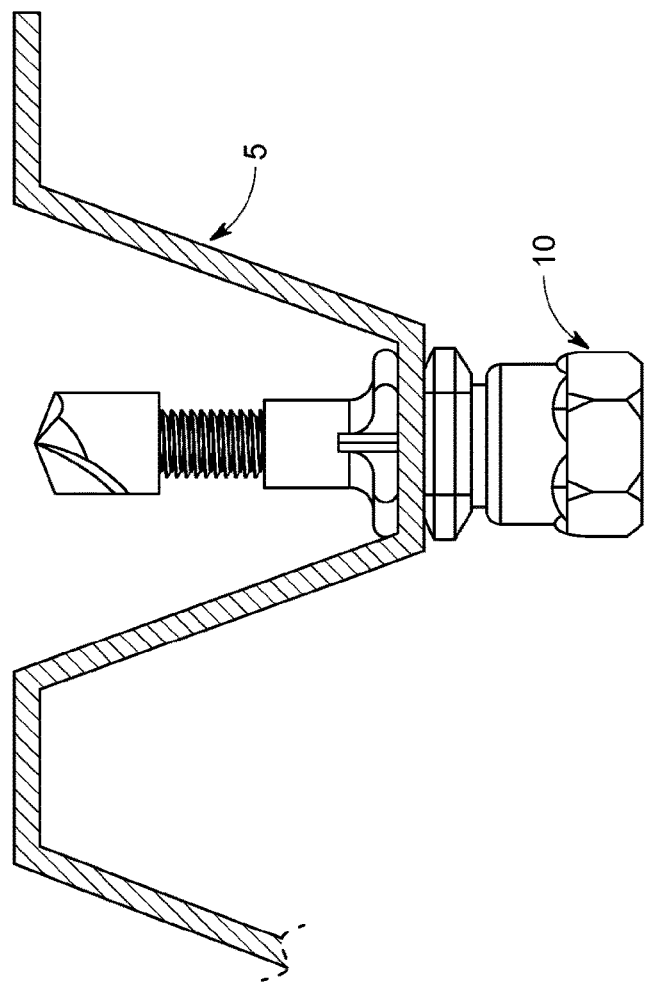
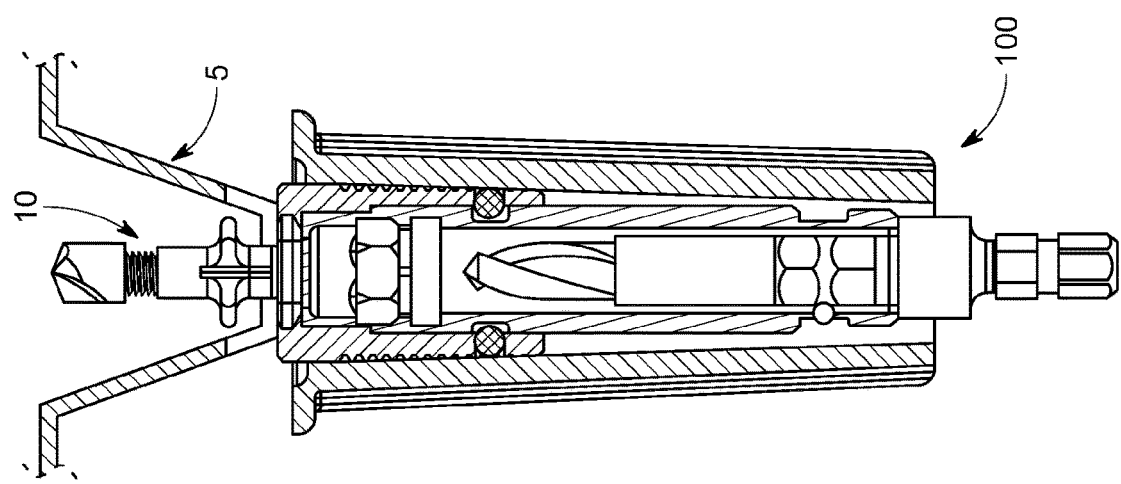
FIG. 11D
FIG. 11C

EXPANDABLE ANCHOR INSTALLATION TOOL AND METHODS OF USE THEREOF

PRIORITY CLAIM

This application claims priority to and the benefit of U.S. Provisional Patent Application Ser. No. 63/327,619, filed Apr. 5, 2022, the entire contents of which are incorporated herein by reference.

BACKGROUND

Various construction and maintenance workers (such as plumbers, electricians, and sprinkler fitters) often have to hang items (such as pipes, conduit, cables, ducts, and lights) from structures (such as ceilings, roofs, decking, beams, joists, Z purlins, and trusses). Various different known expandable anchors are employed for hanging such items from such structures. Various known expandable anchor installation tools are sometimes employed for installing such known expandable anchors in such structures. Various new expandable anchors (such as self-drilling anchors with drill tips) are also being commercialized.

Thus, there is a continuing need for expandable anchor installation tools that are configured to be used to install different types of expandable anchors including self-drilling expandable anchors and non-self-drilling expandable anchors.

SUMMARY

Various embodiments of the present disclosure provide expandable anchor installation tools that are operable with various different expandable anchors including self-drilling and non-self-drilling expandable anchors, and that enhance performance including decreasing installation time and increasing ease of use. Various embodiments of the present disclosure also provide methods of use for installing different expandable anchors using such expandable anchor installation tools.

Other objects, features, and advantages of the present disclosure will be apparent from the following detailed disclosure and accompanying drawings.

BRIEF DESCRIPTION OF THE FIGURES

FIGS. 11A, 11B, 11C, and 11D are a series of partial cross-sectional and partial perspective views showing one method of using the expandable anchor installation tool of FIG. 3 to install the self-drilling expandable anchor of FIG. 1 to an example structure.

DETAILED DESCRIPTION

Figure 1:
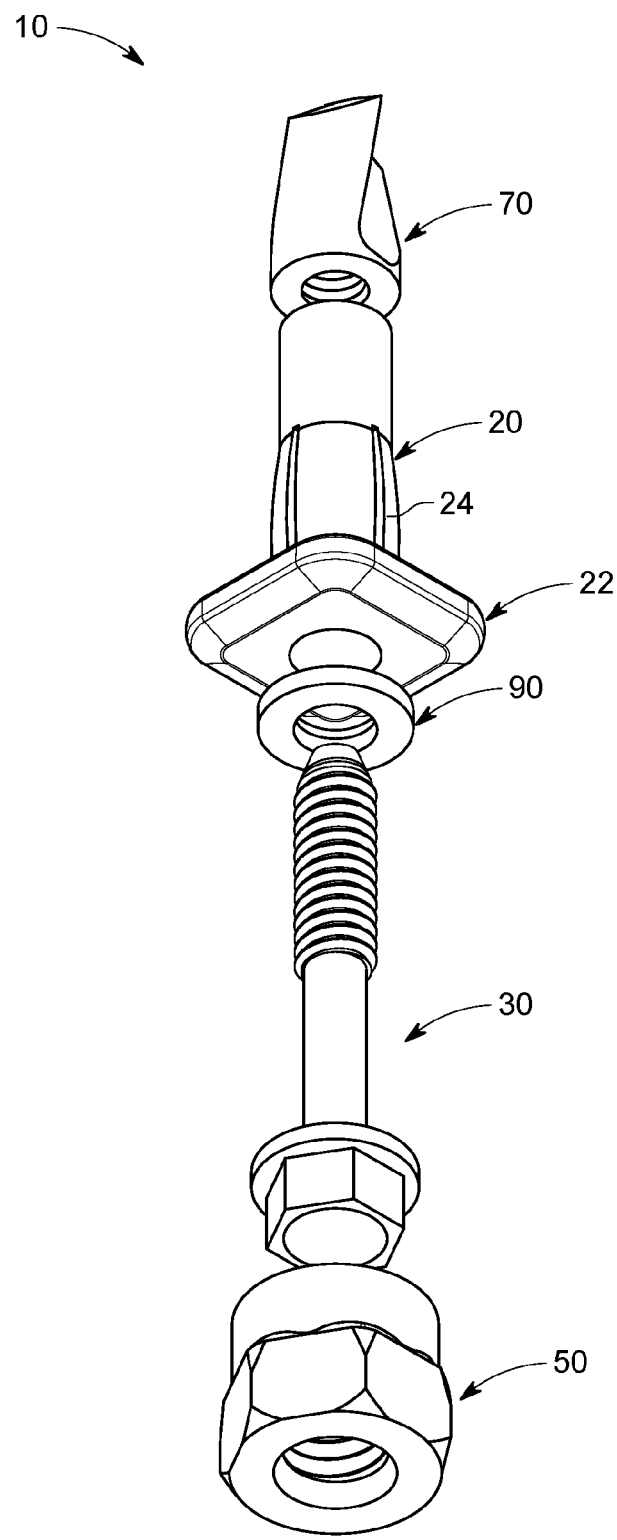
FIG. 1 is an exploded bottom perspective view of an example known self-drilling expandable anchor.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Before describing the various embodiments of the expandable anchor installation tool of the present disclosure, two example expandable anchors are generally described for better understanding of the present disclosure.

Figure 2:
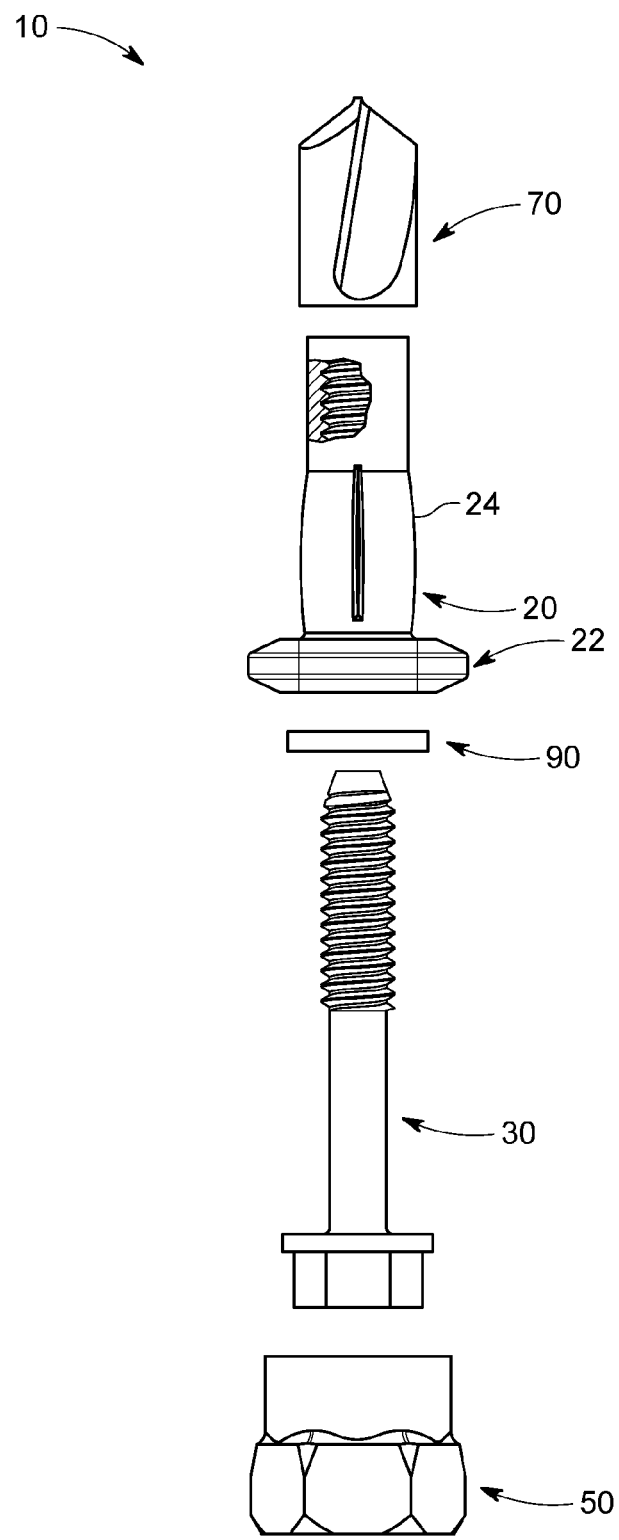
FIG. 2 is an exploded side view of the example known self-drilling expandable anchor of FIG. 1, with a portion broken away.
Figure 3:
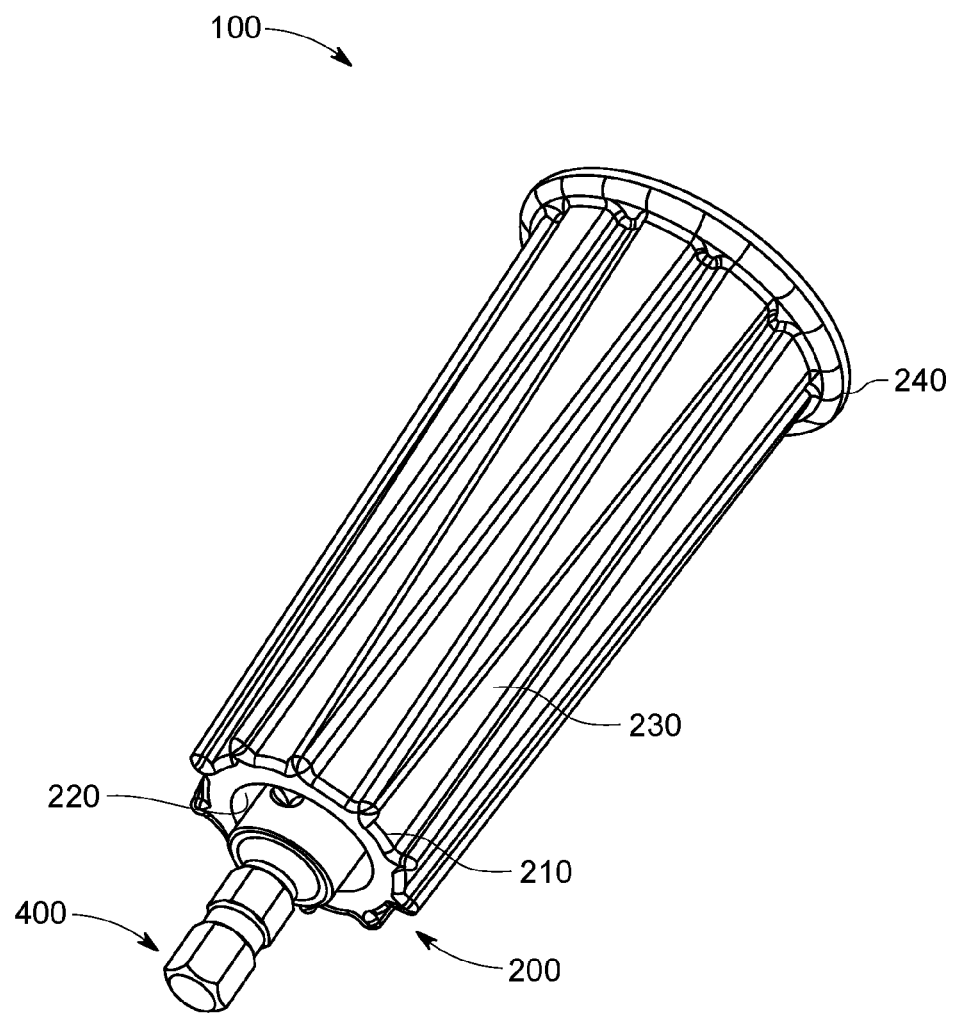
FIG. 3 is an assembled bottom perspective view of an expandable anchor installation tool of one example embodiment of the present disclosure.
Figure 4:
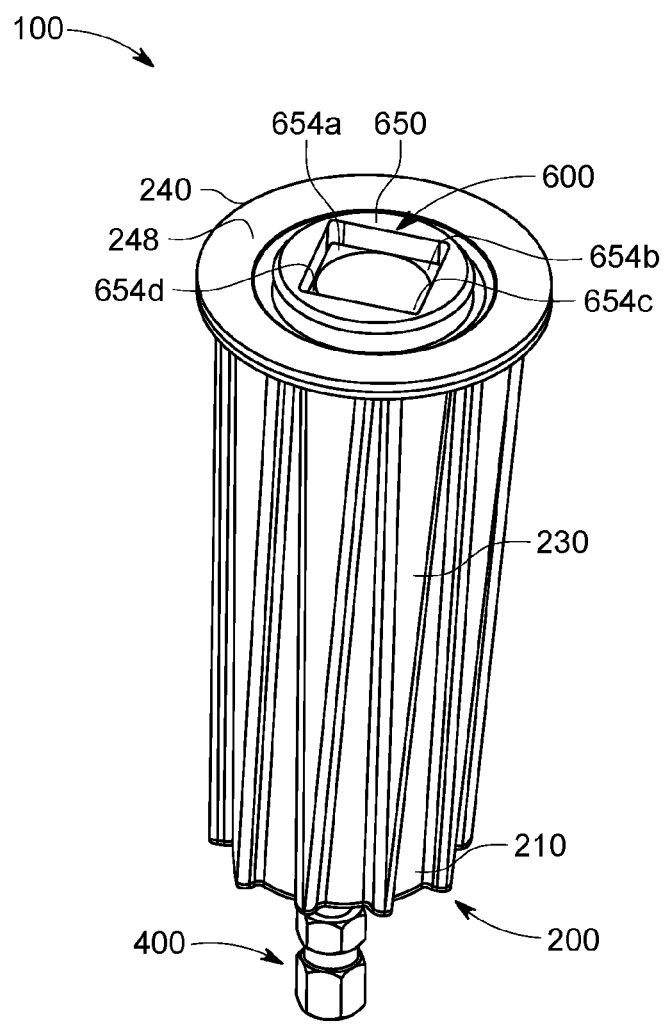
FIG. 4 is an assembled top perspective view of the expandable anchor installation tool of FIG. 3.
Figure 5:
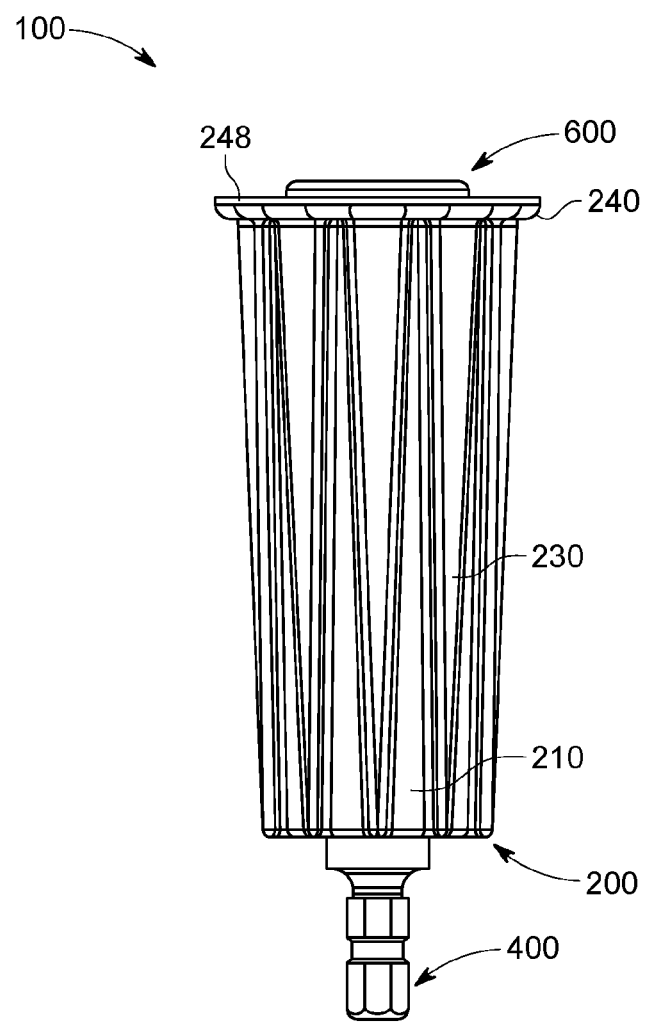
FIG. 5 is an assembled side view of the expandable anchor installation tool of FIG. 3.
Figure 6:
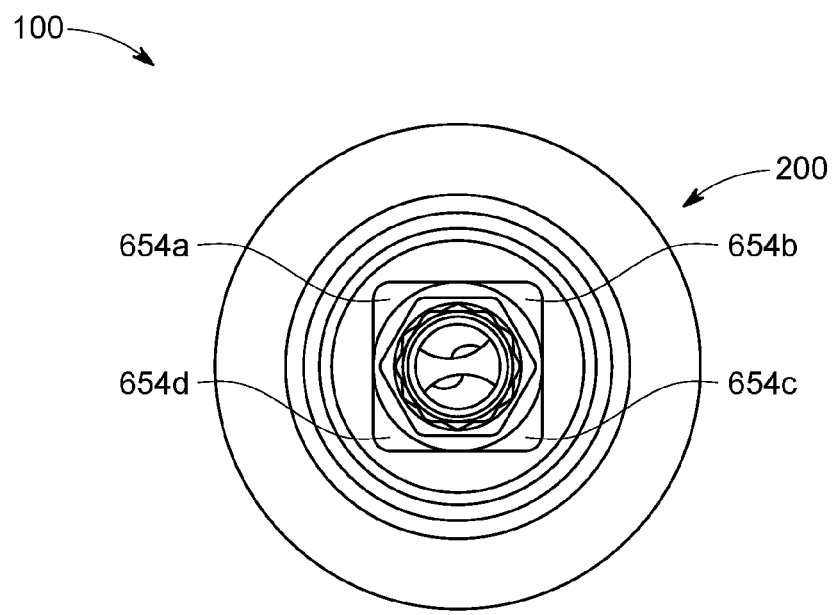
FIG. 6 is an assembled top view of the expandable anchor installation tool of FIG. 3.
Figure 7:
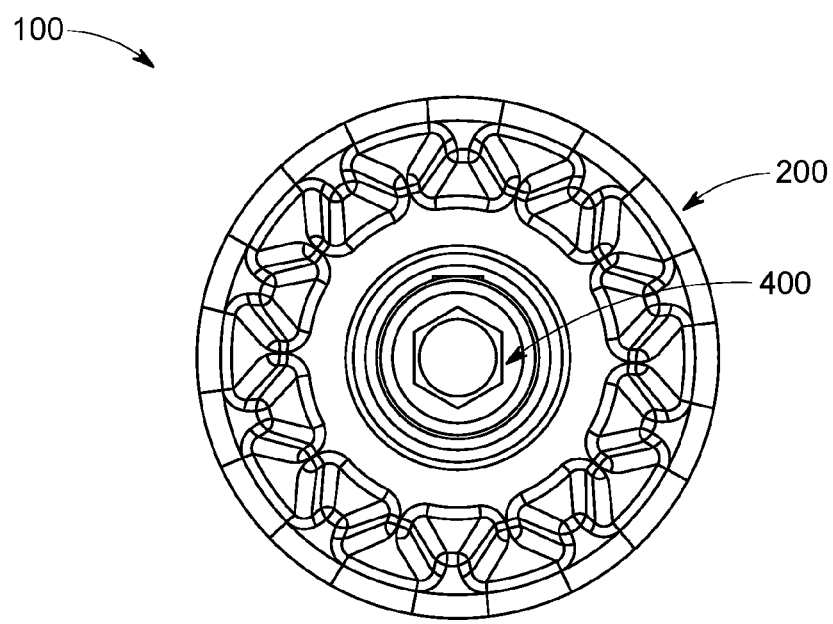
FIG. 7 is an assembled bottom view of the expandable anchor installation tool of FIG. 3.
Figure 8:
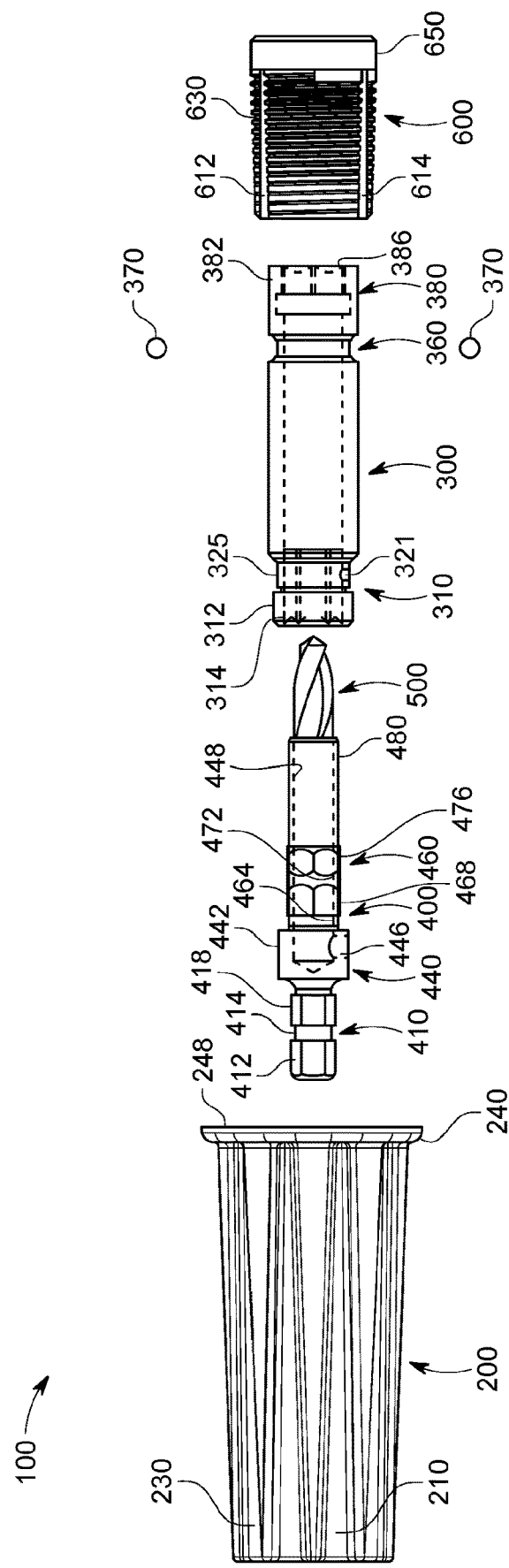
FIG. 8 is a partially exploded side view of the expandable anchor installation tool of FIG. 3.
Figure 9:
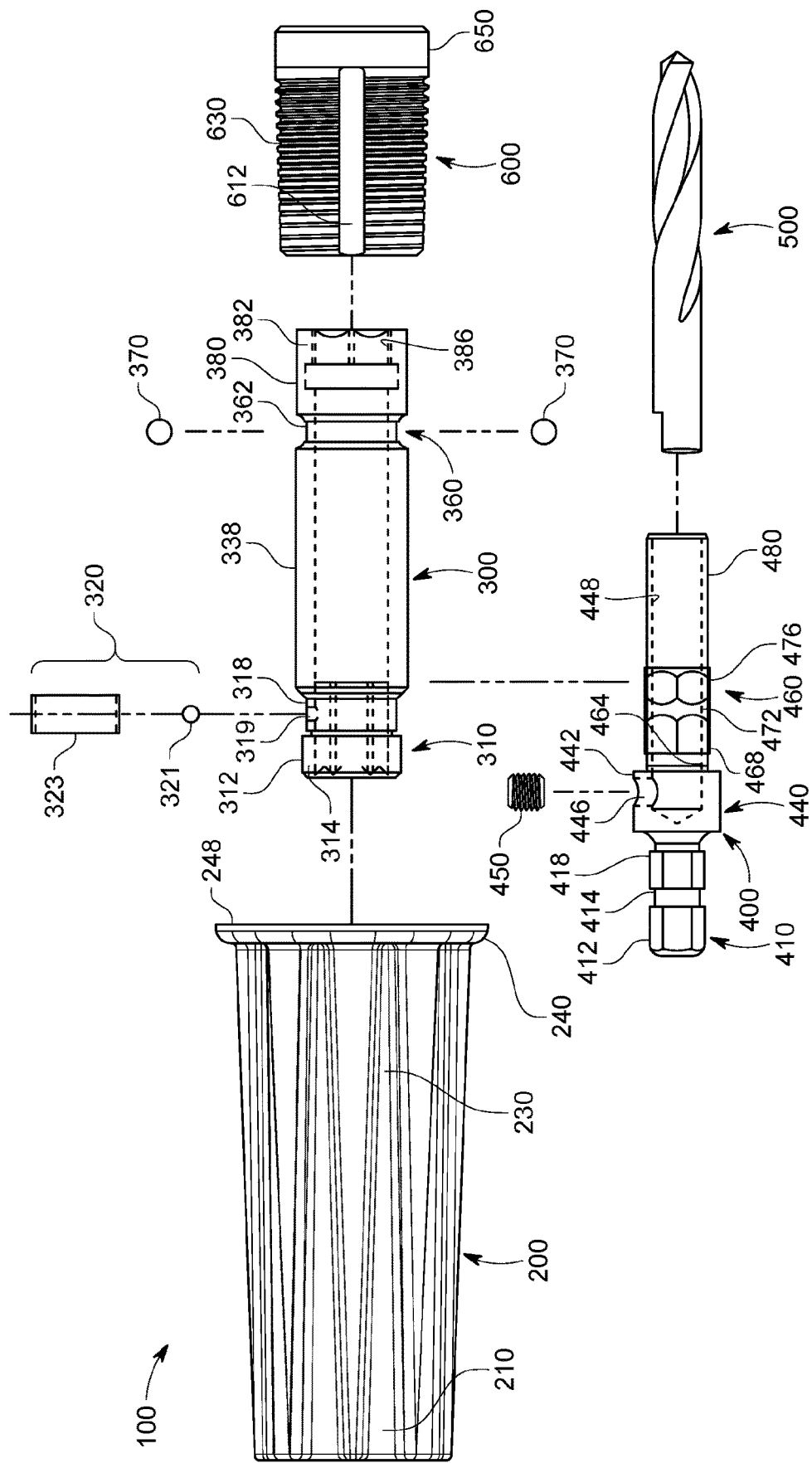
FIG. 9 is a fully exploded side view of the expandable anchor installation tool of FIG. 3.
Figure 10B:
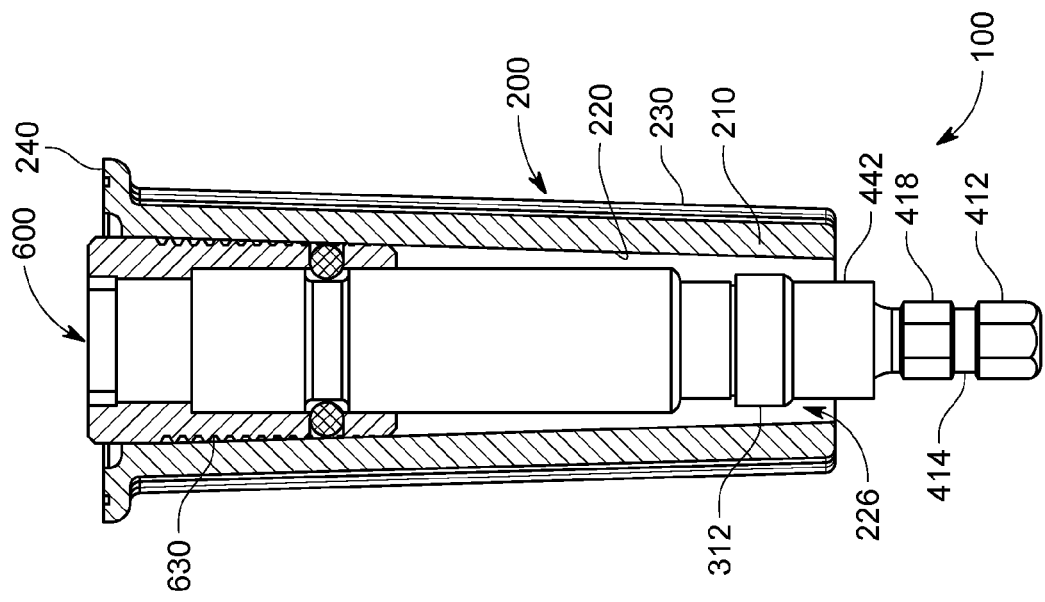
FIGS. 10A, 10B, 10C, 10D, 10E, 10F, 10G, and 10H are a series of different cross-sectional views of the expandable anchor installation tool of FIG. 3.
Figure 10A:
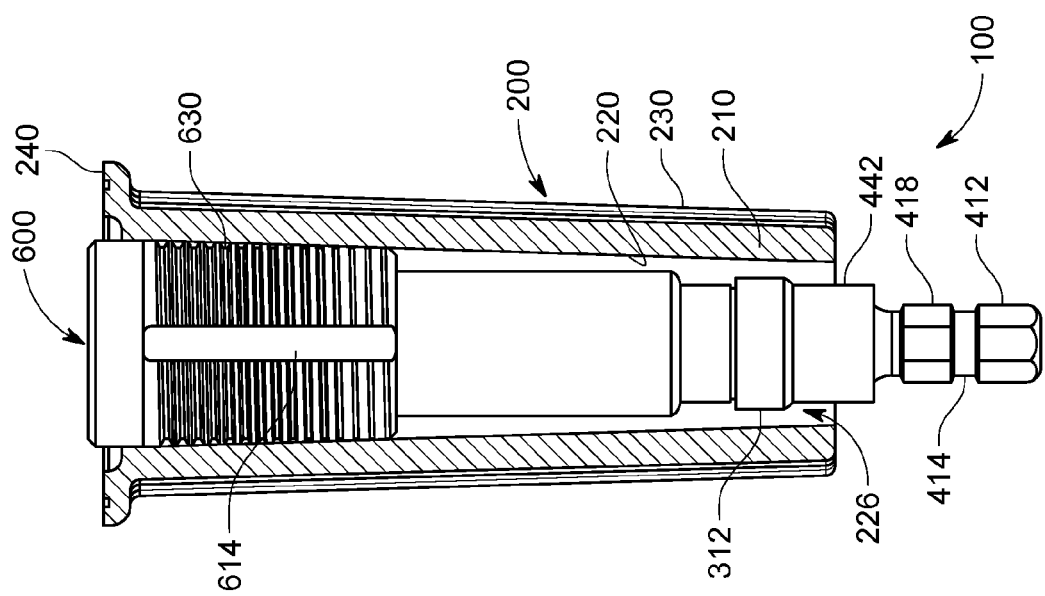
Figure 10D:
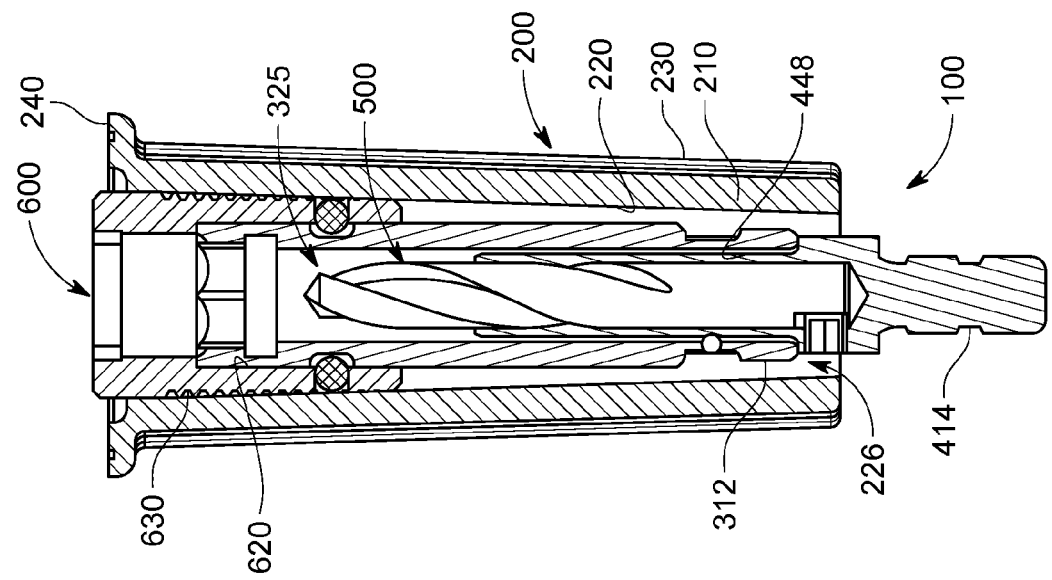
Figure 10C:
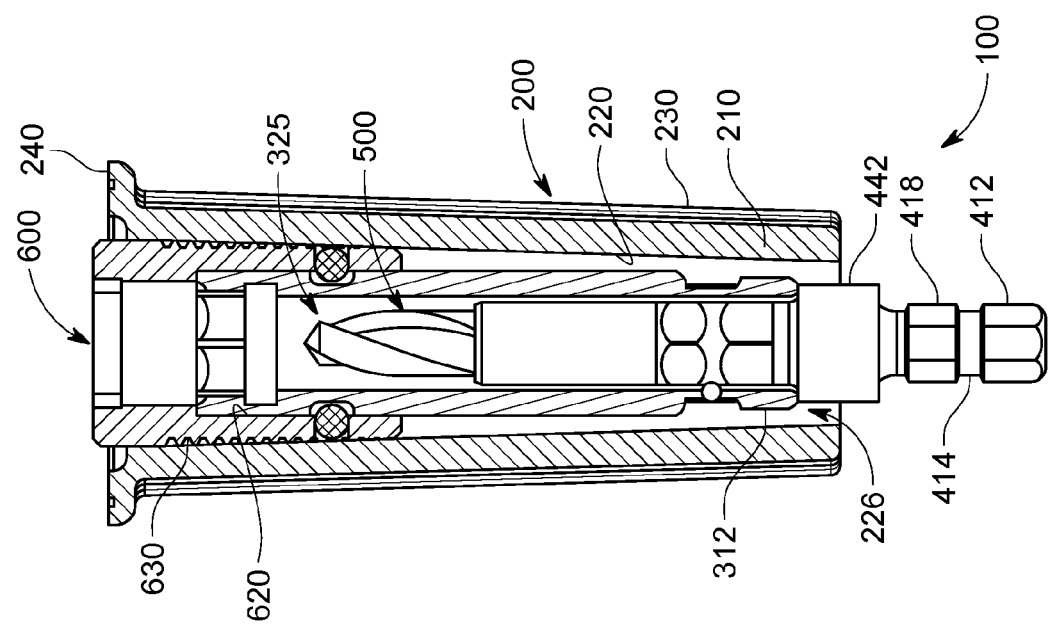
Figure 10E:
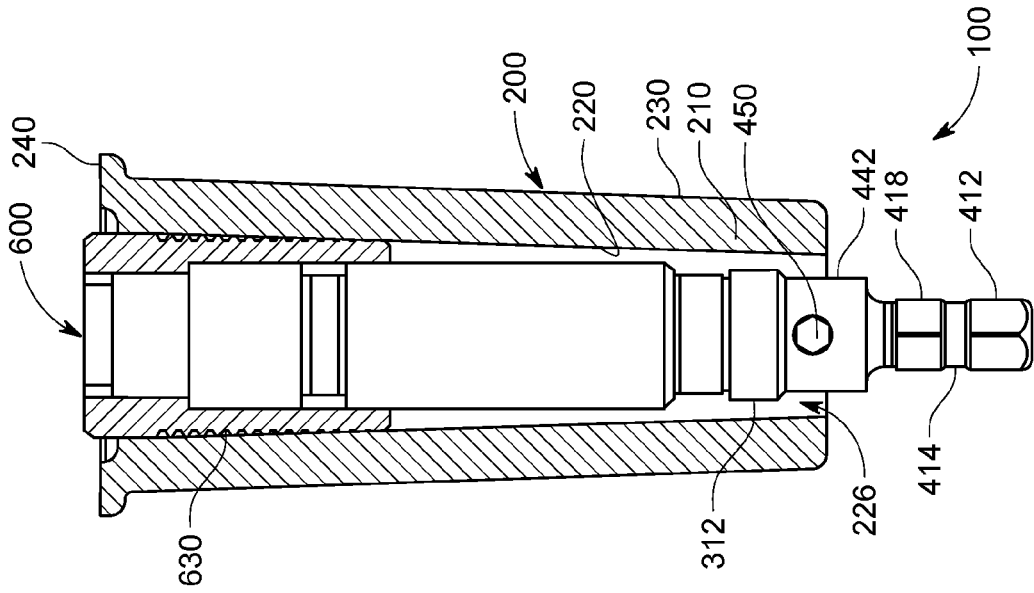
Figure 10F:
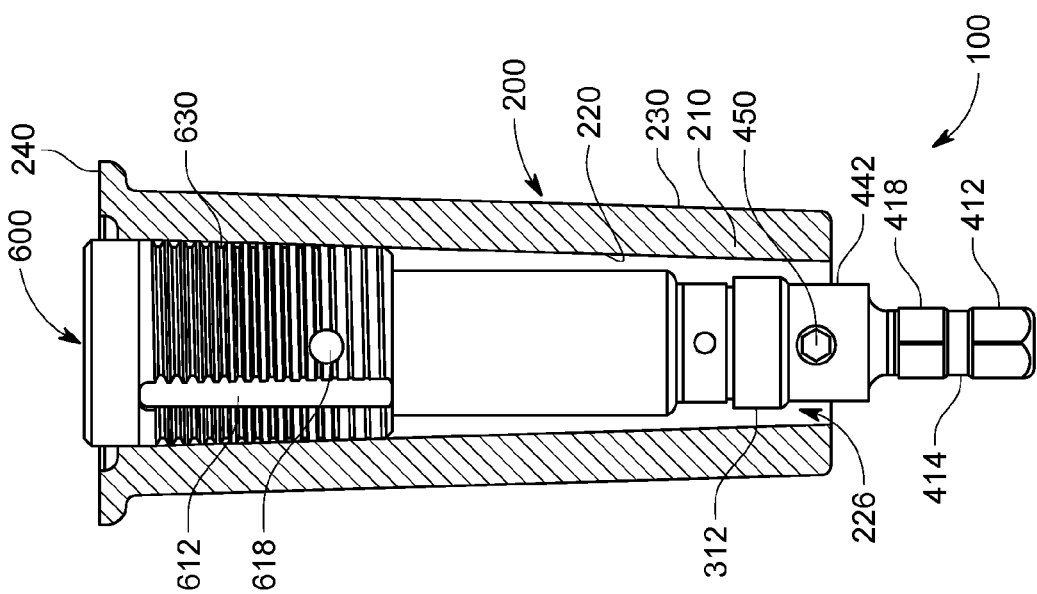
Figure 10G:
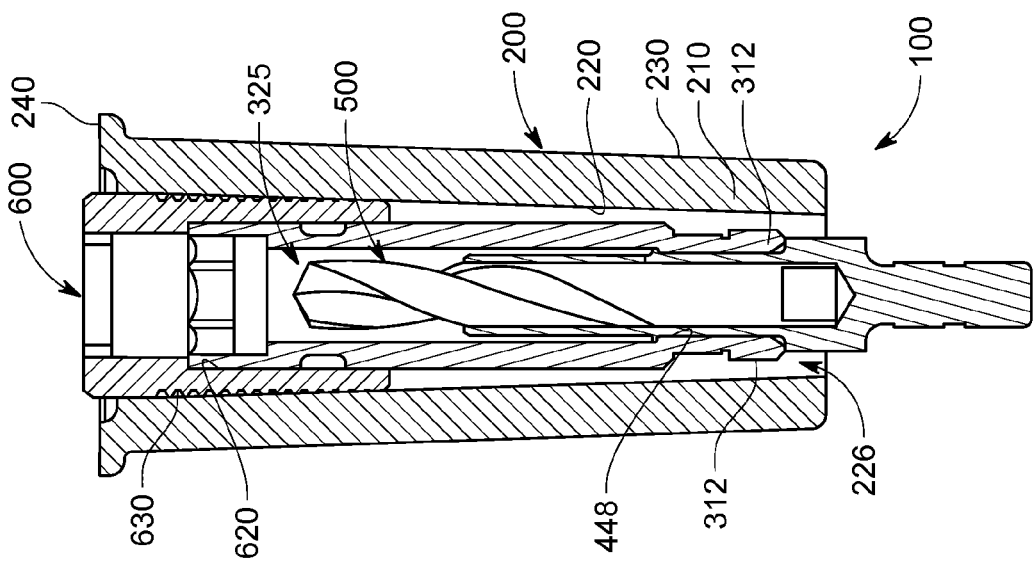
Figure 10H:
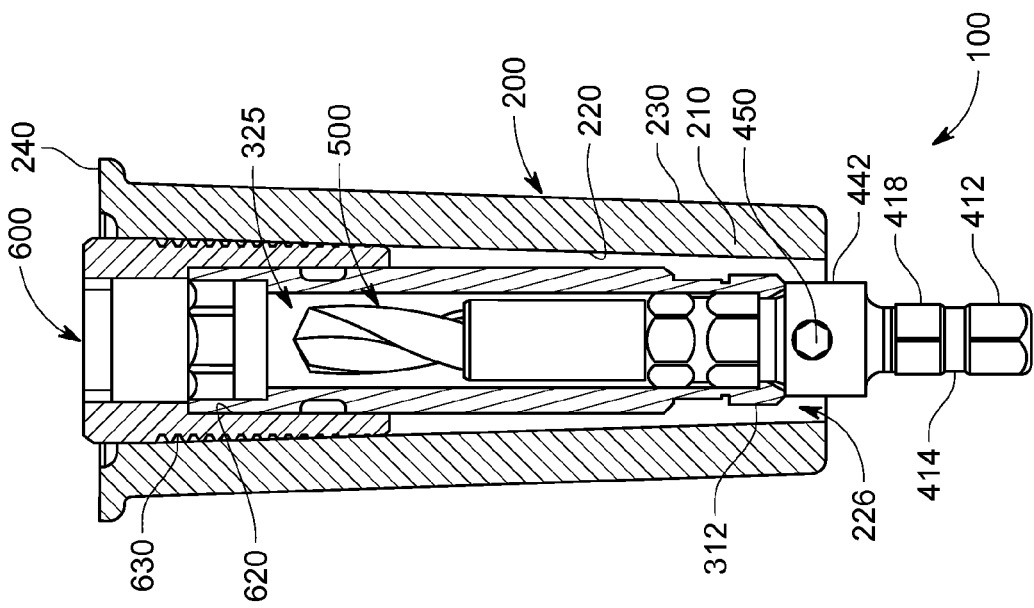

FIGS. 1 and 2 illustrate one example known self-drilling expandable anchor generally indicated by numeral 10. This self-drilling expandable anchor 10 generally includes: (1) an expandable member 20 including a base 22 and an expandable portion 24; (2) a threaded member 30 extendable through and from both ends of the expandable member 20; (3) a hanger 50 attachable to the first or lower end of the threaded member 30; (4) a drill bit 70 connected to the second or upper end of the threaded member 30; and (5) a friction reducing element 90 positionable on the threaded member 30 between the hanger 50 and the expandable member 20. The expandable member 20, the threaded member 30, the hanger 50, the drill bit 70, and the friction reducing element 90 of the self-drilling expandable anchor 10 are configured such that: (a) an expandable anchor installation tool and a drive tool (such as a drill) can be connected to the hanger 50; (b) the installation tool and the drive tool can be employed to rotate the hanger 50, the expandable member 20, the threaded member 30, and the drill bit 70 to drill a hole in a structure; (c) the drill bit 70, part of the expandable member 20, and part of the threaded member 30 can be inserted through the drilled hole; (d) part of an installation tool can be employed to hold a base 22 of the expandable member 20 stationary while another part of the installation tool can be employed to rotate the hanger 50 and the threaded member 30 to cause expandable portion 24 of the expandable member 20 to expand; (e) after the expandable portion 24 of the expandable member 20 expands, the base 22 and the expanded expandable portion 24 of the expandable member 20 secure the self-drilling expandable anchor 10 to the structure; and (f) an item can be attached to the hanger 50 to hang the item from the structure via the self-drilling expandable anchor 10. This example self-drilling anchor is further described in U.S. Patent Application Publication No. 2021/0372449.

Another example known expandable anchor (that is not self-drilling) is described in U.S. Pat. No. 6,935,821. This expandable anchor does not include a drill bit but generally includes: (1) an expandable member; (2) a threaded member extendable through the expandable member; and (3) a hanger attachable to the lower end of the threaded member. The expandable member, the threaded member, and the hanger are configured such that: (a) after a hole is drilled into a structure via a separate drilling apparatus; (b) the threaded member and the expandable member including a base and an expandable portion can be partially inserted through the drilled hole; (c) an expandable anchor installation tool and a drive tool (such as a drill) can be connected to the hanger to hold the base of the expandable member stationary while another part of the installation tool can be employed to rotate the hanger and the threaded member to cause the expandable portion of the expandable member to expand; (d) after the expandable portion of the expandable member expands, the base and the expanded portion of the expandable member secure the expandable anchor to the structure; and (e) an item can be attached to the hanger to hang the item from the structure via the expandable anchor.

FIGS. 3, 4, 5, 6, 7, 8, 9, 10A, 10B, 10C, 10D, 10E, 10F, 10G, and 10H illustrate an expandable anchor installation tool of one example embodiment of the present disclosure. The expandable anchor installation tool is generally indicated by numeral 100 and is configured to be used to install self-drilling or non-self-drilling expandable anchors such as but not limited to the example expandable anchors described above. This illustrated example expandable anchor installation tool 100 includes: (1) a handle 200; (2) a driver 300 positioned in the handle 200; (3) a drill bit holder 400 removably positionable in the driver 300 and in the handle 200 and configured to receive and hold a drill bit such as drill bit 500 (that is removably positionable in the drill bit holder 400) in the driver 300, and in the handle 200; and (4) an expandable member holder 600 positioned in the handle 200. Generally, the expandable member holder 600 is securely connected to the handle 200 and the driver 300 is securely connected to the expandable member holder 600. The drill bit 500 is removably positionable in and connectable to the drill bit holder 400 and the drill bit holder 400 is configured to be partially inserted into and securely connected with a drive tool (such as a drill). The drill bit holder 400 (and the drill bit 500 connected thereto) is also removably insertable in and releasably connected to the driver 300. The configuration enables usage of the expandable anchor installation tool for installing either self-drilling or non-self-drilling expandable anchors as further described below.

More specifically, the handle 200 includes a conical gripping body 210 having a conical inner surface 220 and a conical outer surface 230. The inner surface 220 defines part of a longitudinally extending central opening 226 sized, shaped, and otherwise configured to receive the driver 300, the drill bit holder 400, the drill bit 500, and the expandable member holder 600. The inner surface 220 has a bottom portion (not labeled) and an upper portion (not labeled) configured to mate with and receive the outer textured or knurled outer portion (not labeled) of the expandable member holder 600 such that the expandable member holder 600 can be securely press fit in and positioned in the first or top end of the handle 200. The outer surface 230 includes a plurality of gripping members (not individually labeled) that enable a user to securely grip the handle 200 during use of the expandable anchor installation tool 100 as further described below. The gripping members can be alternatively sized, shaped, and otherwise configured in accordance with the present disclosure.

The first or top end of the handle 200 also includes a gripping head 240 having an inner surface (not labeled) and an outer surface 248. The gripping head 240 functions to protect the hand of the user when the user holds the handle 200. The inner surface defines part of the central opening 226. In the illustrated embodiment, the outer surface 248 defines a chamfer or recess area (not labeled) adjacent to the central opening 226, but other embodiments do not include such a chamfer or recess area. In this illustrated embodiment, the gripping head 240 has only a slightly larger outer circumference than the body 210 of the handle 200. In other embodiments, the gripping head 240 can be made larger or with a larger outer circumference such that the gripping head can further function to protect the user's hand when the user holds the handle 200 and to additionally function to catch and collect metal shavings, bits, and other particles from the drilling of the structure.

In the illustrated example embodiment, the handle 200 is injection molded or 3D printed from a polymer. It should be appreciated that the handle 200 can be made from other suitable materials in accordance with the present disclosure. For example, in various other embodiments, the handle can be formed from aluminum and create the interference or press fit with the expandable member holder 600. In the illustrated example embodiment, this handle 200 is a single monolithically formed piece. In other embodiments, two or more parts of the handle 200 can be separately formed and connected together.

The driver 300 includes: (a) a first driver coupler 310 including a head 312, a first neck 318 connected to the head 312, and a first retainer 320 coupled to the first neck 318; (b) an extender 338 connected to the first neck 318; (c) an expandable member holder gripper 360 including a second neck 362 connected to the extender 338 and configured to receive second retainers 370 that securely couple the expandable member holder 600 to the second neck 362 and thus to the driver 300; and (d) a hanger base socket 380 connected to and extending from the expandable member holder gripper 360.

More specifically, the head 312 of the first driver coupler 310 includes a hollow cylindrical body 314 a having a cylindrical outer surface (not labeled) and a hexagonal inner surface (not labeled) that defines part of a drill bit holder receipt channel 325 that extends though the driver 300 and that sized, shaped, and otherwise configured to receive part of the drill bit holder 400 and the drill bit 500. The hexagonal inner surfaces of the head 312 are configured to receive and mate with the outer surfaces of the first driver engager 468 (described below) and the second driver engager 476 (described below) of the driver gripper 460 (described below) of the drill bit holder 400 such that rotation of the drill bit holder 400 causes rotation of the driver 300.

The first neck 318 includes a hollow cylindrical body. The first neck defines a transversely extending retainer member opening 319.

The first retainer 320 is positioned around and extends partially through the first neck 318 to engage the drill bit holder 400. The first retainer 320 includes a retaining ball 321 positioned in the transversely extending retainer member opening 319 in the first neck 318 and a circumferential retaining band 323 positioned in a circumferential groove (not labeled) defined around the first neck 318. The retaining band 323 biases the retaining ball 321 inwardly in and partially through the transversely extending retainer member opening 319 toward the longitudinal centerline of the driver 300. Tapered inner surfaces that define the transversely extending retainer member opening 319 block the retaining ball 321 from passing fully through the full length of the transversely extending retainer member opening 319 and into the center of the driver 300. The retaining ball 321 is configured to prevent unwanted longitudinal movement or sliding of the driver 300 and the drill bit holder 400 relative to each other when the drill bit holder 400 is positioned in the driver 300. It should be appreciated sufficient longitudinal force will push the retaining ball 321 outwardly in the transversely extending retainer member opening 319 against the force of the retaining band 323 enabling a user to disconnect the drill bit holder 400 from the driver 300, enable the drill bit holder 400 to be removed from the driver 300 (or said alternatively enable the driver 300 to be removed from covering part of the drill bit holder 400). It should be appreciated that when the drill bit holder 400 is removed from the driver 300 (or said alternatively when the driver 300 is removed from covering part of the drill bit holder 400) the drill bit 500 is uncovered by the driver 300 and can be used to drill a hole such as a hole in a structure for inserting an expandable anchor. It should further be appreciated that when the user desires to connect the drill bit holder 400 to the driver 300, the use can insert the drill bit holder 400 in the driver with sufficient longitudinal forces to push the retaining ball 321 outwardly in the transversely extending retainer member opening 319 against the force of the retaining band 323 to enable the drill bit holder 400 to be reconnected to the driver 300.

The extender 338 includes a hollow extender body having a cylindrical outer surface (not labeled) and a cylindrical inner surface defining a drill bit receipt channel (not labeled).

The second neck 362 includes a hollow cylindrical body. The second neck 362 defines a circumferential groove (not labeled) defined around the second neck 362.

The second retainers 370 are configured to engage the expandable member holder 600 and create a secure connection between the driver 300 and the expandable member holder 600. In this illustrated embodiment, the second retainers 370 are in the form of spherical retaining members positioned in the groove defined around the outer surface of the second neck 362. The second retainers 370 prevent unwanted longitudinal movement or sliding of the driver 300 relative to the expandable member holder 600 but allow for the rotation of the driver 300 relative to the expandable member holder 600.

The hanger base socket 380 includes a wall 382 having a cylindrical outer surface (not labeled) and a hexagonal inner surface 386 configured to receive and mate with a hanger base (such as hanger base 50) of an expandable anchor (such as expandable anchor 10) such that rotation of the driver 300 including the hanger base socket 380 causes rotation of the threaded member (such as threaded member 30) of the expandable anchor (such as expandable anchor 10).

In the illustrated example embodiment, the driver 300 (except for the first and second retainers thereof) is formed from a metal material (such as steel). In the illustrated example embodiment, the retainers of the driver 300 are formed from metal materials (such as steel). It should be appreciated that the driver 300 can be made from other suitable materials in accordance with the present disclosure.

In this illustrated example embodiment, this driver 300 (except for the retainers) is a single monolithically formed piece. In other embodiments, two or more parts of the driver 300 in addition to the retainers can be separately formed and connected together.

The drill bit holder 400 includes: (a) a drill coupler 410 including a head 412, a neck 414 connected to the head 412, and an extender 418 connected to the neck 414; (b) a drill bit locker 440 connected to the drill coupler 410 and specifically connected to the drill coupler 410; and (c) a driver gripper 460 connected to the drill bit locker 440.

The drill coupler 410 is configured to be inserted and secured in a longitudinal slot (not shown) of or defined by a drill. More specifically, the head 412 includes a solid hexagonal head body having a flat circular end wall (not labeled) and six oval-shaped exterior surfaces (not labeled) defining six exterior edges (not labeled). The exterior surfaces define a hexagonal perimeter of the solid head body of the head 412 configured to be inserted into the longitudinal slot of the drill. The neck 414 is also configured to be inserted into the longitudinal slot of the drill. The neck 414 includes a solid cylindrical body. The extender 418 is also configured to be inserted into the longitudinal slot of the drill. The extender 418 partly includes a solid hexagonal extender body having a six oval-shaped exterior surfaces (not labeled) defining exterior edges (not labeled). The extender 418 also includes a somewhat cone-shaped transition section (not labeled) connected to the drill bit locker 440. It should thus be appreciated that hexagonal shapes of the head 412 and the extender 418 of the drill coupler 410 are configured enable the drill coupler 410 to be firmly held and rotated by the drill and that the other head and extender shapes can be employed to facilitate the drill firmly holding the drill coupler.

The drill bit locker 440 is configured to lock a drill bit such as drill bit 500 in place in the drill bit holder 400. The drill bit locker 440 includes a generally cylindrical hollow drill bit locker body 442 and a set screw 450. The drill bit locker body 442 has a generally cylindrical exterior surface (not labeled) and a partially cylindrical inner surface (not labeled) defining a portion of the internal drill bit receiving slot 448. The drill bit locker body 442 defines a transversely and radially extending cylindrical surface having a threaded portion and defining a set screw opening 446. The set screw opening 446 transversely and radially extends from the drill bit receiving slot 448 to the exterior surface of the drill bit locker body 442. The drill bit locker body 442 also has an interior somewhat transversely extending stopping surface (not labeled) defining an inner end of the drill bit receiving slot 448. The set screw 450 has an outer threaded portion (not labeled), is configured to be threadably received in the set screw opening 446, and configured to engage an inner end of the shank (not labeled) of the drill bit 500 to hold the drill bit 500 in the drill bit locker 440 and thus in the drill bit holder 400.

The driver gripper 460 is configured to removably receive and hold the drill bit 500, and when inserted into the driver 300 engage inner surfaces of the driver 300 as mentioned above. The driver gripper 460 generally includes: (a) a first cylindrical extender 464, (b) a first driver engager 468, (c) a second cylindrical extender 472, (d) a second driver engager 476, and (e) a third cylindrical extender 480. The first cylindrical extender 464 is shaped, sized, and otherwise configured to be positioned in the driver 300.

The first cylindrical extender 464 includes a generally cylindrical and hollow first extender body (not labeled) having a cylindrical outer surface (not labeled) and a cylindrical inner surface (not labeled) that defines a portion of the longitudinally extending drill bit receiving slot 448.

The first driver engager 468 is shaped, sized, and otherwise configured to be positioned in the driver 300. The first driver engager 468 includes a hexagonal and hollow first engager body (not labeled) defining a portion of the longitudinally extending drill bit receiving slot 468. The first engager body has six exterior surfaces (not labeled) defining six exterior edges (not labeled). The first driver engager 468 is configured to engage the inner surface of the driver 300 such that when the drill bit holder 400 is rotated the driver 300 is rotated.

The second cylindrical extender 472 is shaped, sized, and otherwise configured to be positioned in the driver 300. The second cylindrical extender 472 includes a generally cylindrical and hollow second extender body (not labeled) having a cylindrical outer surface (not labeled) and a cylindrical inner surface (not labeled) that defines a portion of the longitudinally extending drill bit receiving slot 448.

The second driver engager 476 is shaped, sized, and otherwise configured to be positioned in the driver 300. The second driver engager 476 includes a hexagonal and hollow first engager body (not labeled) defining a portion of the longitudinally extending drill bit receiving slot 448. The first engager body has six exterior surfaces (not labeled) defining six exterior edges (not labeled). The second driver engager 476 is configured to engage the inner surface of the driver 300 such that when the drill bit holder 400 is rotated the driver 300 is rotated.

The third cylindrical extender 480 is shaped, sized, and otherwise configured to be positioned in the driver 300. The third cylindrical extender 480 includes a generally cylindrical and hollow first extender body (not labeled) having a cylindrical outer surface (not labeled) and a cylindrical inner surface (not labeled) that defines a portion of the longitudinally extending drill bit receiving slot 448.

In the illustrated example embodiment, the drill bit holder 400 (including the set screw 450) is formed from a metal material (such as steel). It should be appreciated that the drill bit holder 400 can be made from other suitable materials in accordance with the present disclosure. In this illustrated example embodiment, this drill bit holder 400 (except for the set screw 450) is a single monolithically formed piece. In other embodiments, two or more parts of the drill bit holder 400 in addition to the set screw 450 can be separately formed and connected together.

The drill bit 500 includes a shank 510 having a drill end 530 and a connection end 560. The connection end 560 is configured to be positioned in the drill bit holder 400. In the illustrated example embodiment, the drill bit 500 is formed from a metal material (such as steel). It should be appreciated that the drill bit 500 can be made from other suitable materials in accordance with the present disclosure. In this illustrated example embodiment, this drill bit 500 is a single monolithically formed piece. In other embodiments, two or more parts of the drill bit 500 can be separately formed and connected together.

The expandable member holder 600 includes a conical handle connection wall (not labeled) having a stepped inner surface 620 and a textured (such as knurled or threaded) outer surface 630. The stepped inner surface 620 defines a longitudinally extending central opening 626 sized, shaped, and otherwise configured to receive the first or top part of the driver 300. The inner surface 620 has a smooth first or bottom section (not labeled) having a first inner diameter and a smooth second or upper section (not labeled) having a second inner diameter that is smaller than the first inner diameter. The inner surface 620 thus has an inward step (not labeled) with an internal stop (not labeled). The outer surface 630 includes a textured portion configured to mate with and be press fit received within the top portion of the handle 200 such that the expandable member holder 600 can be securely inserted in the top end of the handle 200. The first section 620 defines an interior passageway (not labeled) that is larger than the outer diameter of the hanger base socket 380 of the driver 300. In the illustrated example embodiment, the handle connection wall defines longitudinally extending slots 612 and 614 configured to receive an adhesive to further securely connect the handle 200 with the expandable member holder 600. The handle connection wall can define one or more transversely extending openings 618 configured to receive one or more second retainers 370 for securely connecting the driver 300 to the expandable member holder 600. It should be appreciated that other suitable connection member or mechanisms can be employed to securely connect the expandable member holder 600 to the handle 200 and to the driver 300.

Figure 11B:
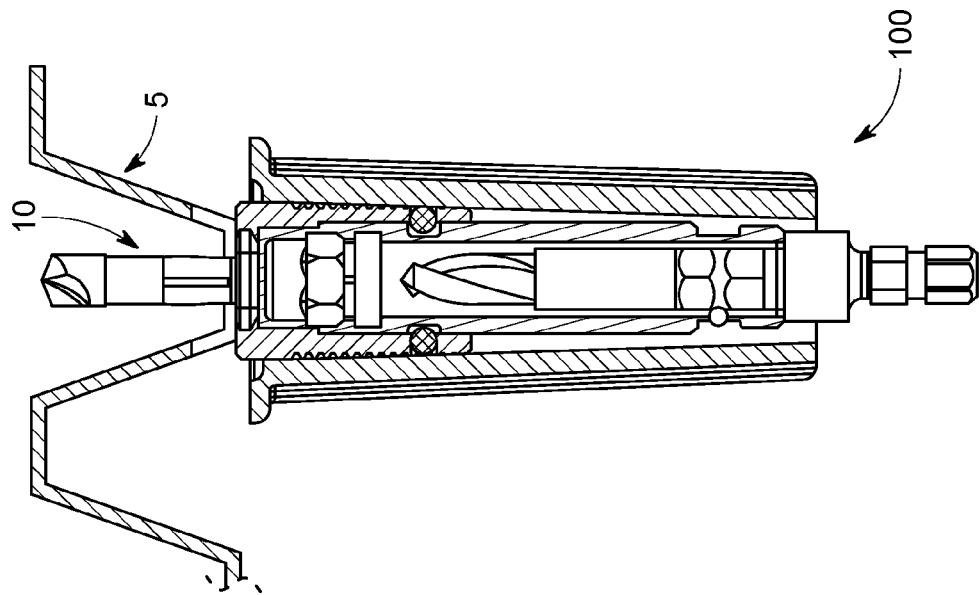
Figure 11A:
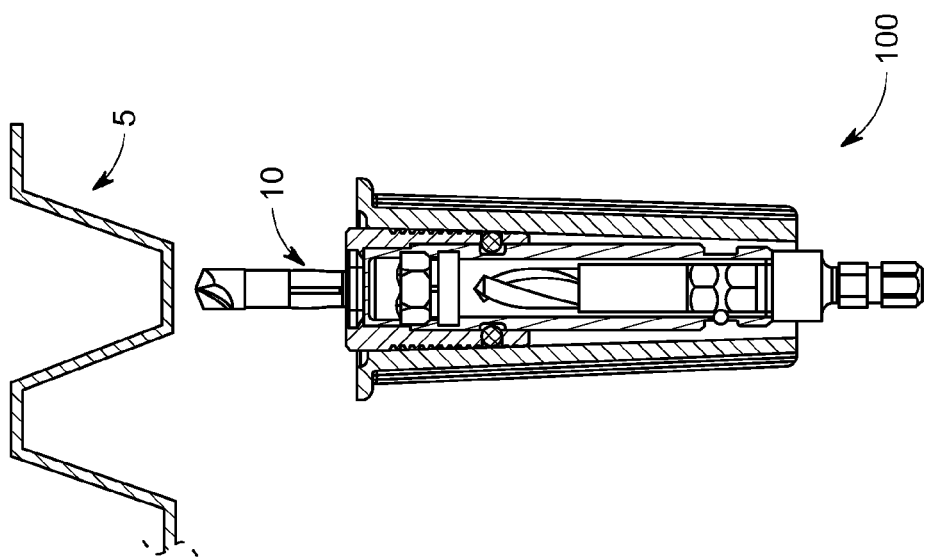

The expandable member holder 600 also includes an anchor base engager 650 having inner surfaces as described below and a cylindrical outer surface (not labeled). More specifically, the anchor base engager 650 defines four interior base receiving pockets 654a, 654b, 654c, and 654d that are configured to respectively receive and hold the four corners of a base (such as base 22) of an expandable member (such as expandable member 20) of an expandable anchor (such as expandable anchor 10) when the expandable member holder 600 is positioned on and in engagement with the base of the expandable member of the expandable anchor. It should be appreciated that the co-acting inner surfaces of the anchor base engager 650 can be alternatively formed (such as but not limited to a six or eight point configuration). Specifically, this engagement by the anchor base engager 650 with the corners of a base of an expandable member of an expandable anchor occurs when the expandable anchor is positioned in the expandable member holder 600 such as shown in FIGS. 11A, 11B, and 11C. When the handle 200 of the installation tool 100 is held stationary by a user, the engagement of the expandable member holder 600 and specifically the anchor base engager 650 with the base of the expandable member of the expandable anchor enables the expandable member holder 600 to hold that base in place without spinning after the expandable member is inserted partially through the structure and the installer desires to collapse and expand of the expandable portion of the expandable member. In this illustrated example embodiment, each of the interior base receiving pockets 654a, 654b, 654c, and 654d is defined by three interior walls (not labeled) that are formed in the anchor base engager 650. These three walls (e.g., the bottom wall and two side walls) that define each pocket are sized to engage the rear surface or a respective one of the side edges of the respective corner of the base of the expandable member of the expandable anchor.

In the illustrated example embodiment, the expandable member holder 600 is formed from a metal material (such as steel). It should be appreciated that the expandable member holder 600 can be made from other suitable materials in accordance with the present disclosure. In this illustrated example embodiment, this expandable member holder 600 is a single monolithically formed piece. In other embodiments, two or more parts of the expandable member holder 600 can be separately formed and connected together.

In this illustrated example embodiment, the expandable anchor installation tool 100 is configured to install a self-drilling expandable anchor such as the self-drilling expandable anchor 10 as shown in 11A, 11B, 11C, and 11D. To do so, the expandable anchor installation tool 100 is used in its assembled configuration as shown in FIGS. 3 to 7, 10A to 10H, and 11A to 11C.

This process generally includes: (a) connecting the tool 100 to a drill (not shown) and specifically connecting the drill bit holder 400 to the drill; (b) connecting the tool 100 and specifically the driver 400 to the hanger 50 of a self-drilling expandable anchor 10 such as shown in FIG. 11A; (c) positioning the drill, the tool 100, and the self-drilling expandable anchor 10 adjacent to the metal structure such as steel deck shown in FIG. 11B; (d) without holding the handle 200 stationary, using the drill to rotate the tool 100 and the self-drilling expandable anchor 10 to drill a hole in the structure and to insert the expandable anchor 10 partially through the structure such as shown in FIG. 11C; (e) holding the handle 200 stationary to hold the base of the expandable member of the expandable anchor stationary and simultaneously using the drill to rotate the tool 100 and the threaded member 30 of self-drilling expandable anchor 10 to collapse and expand the expandable portion of the expandable member of the expandable anchor 10 as shown in FIG. 11D; and (f) removing the tool 100 and specifically the driver 400 from the hanger 50 of a self-drilling expandable anchor 10 such as shown in FIG. 11D. FIGS. 11A, 11B, 11C, and 11D thus generally show one example method of using the expandable anchor installation tool 100 to install a self-drilling expandable anchor 10 to a structure S.

It should be appreciated that the installation tool 100 can also be employed to install expandable anchors that are non-self-drilling. This process generally includes: (a) connecting the tool 100 to a drill and specifically connecting the drill bit holder 400 to the drill; (b) removing the handle 200, the driver 300 positioned in the handle 200, and the expandable member holder 600 positioned in the handle 200 from the drill bit holder 400 and the drill bit 500; (c) drilling a hole in the structure using the drill, the drill bit holder 400, and the drill bit 500; (d) repositioning the handle 200, the driver 300 positioned in the handle 200, and the expandable member holder 600 on the drill bit holder 400 and the drill bit 500; (e) connecting the tool 100 and specifically the driver 400 to the hanger 50 of a non-self-drilling expandable anchor; (f) positioning the drill, the tool 100, and the non-self-drilling expandable anchor 10 adjacent to the structure S; (g) without holding the handle 200 stationary, using the drill insert the expandable anchor 10 partially through the structure; (g) holding the handle 200 stationary to hold the base of the expandable member of the expandable anchor stationary and simultaneously using the drill to rotate the tool 100 and the threaded member 30 of non-self-drilling expandable anchor to collapse and expand the expandable portion of the expandable member of the expandable anchor; and (h) removing the tool 100 and specifically the driver 400 from the hanger 50 of the expandable anchor 10. It should be appreciated that steps (e) and (f) can be done in the reverse order.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An expandable anchor installation tool for an expandable anchor, said expandable anchor installation tool comprising:
   a handle;
   an expandable member holder positioned in and connected to the handle;
   a driver positioned in the expandable member holder; and
   a drill bit holder removably partially positionable in the handle and removably partially positionable in and removably connectable to the driver, the drill bit holder configured to receive and hold a drill bit.

2. The expandable anchor installation tool of claim 1, wherein the handle includes an inner surface that defines part of a central opening configured to receive the driver, the drill bit holder, the drill bit, and the expandable member holder, wherein the inner surface has a portion configured to mate with and securely receive a textured outer portion of the expandable member holder.

3. The expandable anchor installation tool of claim 1, wherein the expandable member holder includes a stepped inner surface and a central opening configured to receive part of the driver.

4. The expandable anchor installation tool of claim 1, wherein the expandable member holder includes an anchor base engager that defines interior base receiving pockets that are configured to respectively receive and hold a base of an expandable member of the expandable anchor.

5. The expandable anchor installation tool of claim 1, wherein the driver includes a first driver coupler, an extender connected to the first driver coupler, an expandable member holder gripper connected to the extender, and a hanger base socket connected to and extending from the expandable member holder gripper.

6. The expandable anchor installation tool of claim 1, wherein the driver includes a first driver coupler including a first retainer, an extender connected to the first driver coupler, an expandable member holder gripper including a second retainer, and a hanger base socket connected to and extending from the expandable member holder gripper.

7. The expandable anchor installation tool of claim 1, wherein the driver includes (a) a first driver coupler including a head, a first neck connected to the head, and a first retainer coupled to the first neck; (b) an extender connected to the first neck; (c) an expandable member holder gripper including a second neck connected to the extender and a second retainer coupled to the second neck; and (d) a hanger base socket connected to and extending from the expandable member holder gripper.

8. The expandable anchor installation tool of claim 1, wherein the drill bit holder includes a drill coupler, a drill bit locker connected to the drill coupler, and a driver gripper connected to the drill bit locker.

9. The expandable anchor installation tool of claim 1, wherein the drill bit holder includes (a) a drill coupler including a head, a neck connected to the head, and an extender connected to the neck; (b) a drill bit locker connected to the drill coupler; and (c) a driver gripper connected to the drill bit locker.

10. The expandable anchor installation tool of claim 1, wherein the drill bit holder includes a drill coupler, a drill bit locker connected to the drill coupler, and a driver gripper connected to the drill bit locker, wherein the driver gripper includes a first extender, a first driver engager, a second cylindrical extender, a second driver engager, and a third cylindrical extender.

11. An expandable anchor installation tool for an expandable anchor, said expandable anchor installation tool comprising:
a handle;
an expandable member holder positioned in and connected to the handle;
a driver positioned in the expandable member holder; and
a drill bit holder removably partially positionable in the handle and removably partially positionable in and removably connectable to the driver, the drill bit holder configured to receive and hold a drill bit,
wherein the handle includes an inner surface that defines part of a central opening configured to receive the driver, the drill bit holder, the drill bit, and the expandable member holder,
wherein the expandable member holder includes a stepped inner surface and a central opening configured to receive part of the driver, wherein the expandable member holder includes an anchor base engager that defines interior base receiving pockets that are configured to respectively receive and hold a base of an expandable member of the expandable anchor, and
wherein the driver includes a first driver coupler, an extender connected to the first driver coupler, an expandable member holder gripper connected to the extender, and a hanger base socket connected to and extending from the expandable member holder gripper.

12. The expandable anchor installation tool of claim 11, wherein the first driver coupler includes a first retainer, and the expandable member holder gripper includes a second retainer.

13. The expandable anchor installation tool of claim 11, wherein (a) the first driver coupler includes a head, a first neck connected to the head, and a first retainer coupled to the first neck; (b) the extender is connected to the first neck; (c) the expandable member holder gripper includes a second neck connected to the extender and a second retainer coupled to the second neck; and (d) the hanger base socket is connected to and extends from the expandable member holder gripper.

14. An expandable anchor installation tool for an expandable anchor, said expandable anchor installation tool comprising:
a handle;
an expandable member holder positioned in and connected to the handle;
a driver positioned in the expandable member holder; and
a drill bit holder removably partially positionable in the handle and removably partially positionable in and removably connectable to the driver, the drill bit holder configured to receive and hold a drill bit, wherein the drill bit holder includes a drill coupler, a drill bit locker connected to the drill coupler, and a driver gripper connected to the drill bit locker, wherein the driver gripper includes a first extender, a first driver engager, a second cylindrical extender, a second driver engager, and a third cylindrical extender.

15. The expandable anchor installation tool of claim 14, wherein (a) the drill coupler includes a head, a neck connected to the head, and an extender connected to the neck; (b) the drill bit locker is connected to the drill coupler; and (c) the driver gripper is connected to the drill bit locker.

* * * * *